United States Patent
Korda et al.

(12) 
(10) Patent No.: US 6,564,210 B1
(45) Date of Patent: May 13, 2003

(54) SYSTEM AND METHOD FOR SEARCHING DATABASES EMPLOYING USER PROFILES

(75) Inventors: Nahum Korda, Herzlia (IL); Uri Weinbeber, Matan (IL); Shmulik Regev, Tel Aviv (IL)

(73) Assignee: Virtual Self Ltd., Ramat-Gan (IL)

( * ) Notice: Subject to any disclaimer, the term of this patent is extended or adjusted under 35 U.S.C. 154(b) by 0 days.

(21) Appl. No.: 09/535,177

(22) Filed: Mar. 27, 2000

(51) Int. Cl.[7] .............................................. G06F 17/30
(52) U.S. Cl. ......................................................... 707/3
(58) Field of Search .............................................. 707/3

(56) References Cited

U.S. PATENT DOCUMENTS

| | | | | |
|---|---|---|---|---|
| 5,745,889 A | * | 4/1998 | Burrows ...................... | 707/102 |
| 5,754,766 A | * | 5/1998 | Shaw et al. .................. | 709/200 |
| 5,822,539 A | * | 10/1998 | Van Hoff ..................... | 709/236 |
| 5,913,208 A | * | 6/1999 | Brown et al. ................. | 707/3 |
| 5,920,854 A | * | 7/1999 | Kirsch et al. ................. | 707/3 |
| 5,924,108 A | * | 7/1999 | Fein et al. .................... | 707/531 |
| 5,974,412 A | * | 10/1999 | Hazlehurst et al. ............. | 707/3 |
| 6,006,221 A | * | 12/1999 | Liddy et al. .................... | 707/5 |
| 6,012,053 A | * | 1/2000 | Pant et al. ...................... | 707/3 |
| 6,029,165 A | * | 2/2000 | Gable ............................. | 707/3 |
| 6,092,034 A | * | 7/2000 | McCarley et al. .............. | 704/2 |
| 6,128,613 A | * | 10/2000 | Wong et al. ................... | 707/7 |
| 6,154,213 A | * | 11/2000 | Rennison et al. ........... | 345/854 |
| 6,175,829 B1 | * | 1/2001 | Li et al. ......................... | 707/3 |
| 6,189,002 B1 | * | 2/2001 | Roitblat ........................ | 707/1 |
| 6,211,876 B1 | * | 4/2001 | Ackermann et al. ........ | 345/835 |
| 6,240,409 B1 | * | 5/2001 | Aiken ............................ | 707/4 |
| 6,249,795 B1 | * | 6/2001 | Douglas ....................... | 707/511 |
| 6,275,789 B1 | * | 8/2001 | Moser et al. .................. | 704/7 |
| 6,317,708 B1 | * | 11/2001 | Witbrock et al. .............. | 704/9 |

\* cited by examiner

*Primary Examiner*—Wayne Amsbury
(74) *Attorney, Agent, or Firm*—Fay Kaplun & Marcin, LLP

(57) ABSTRACT

A computer program method enables a user to find the most relevant documents by searching of distributed databases, i.e., the World Wide Web. The program employs the user's profile, based on the user's foci of interest, the user's query and a semantic analysis of the query and documents. In one embodiment, the retrieved documents are ranked according to relevancy based on the user's profile and query.

14 Claims, 3 Drawing Sheets

SYSTEM AND METHOD FOR SEARCHING DATABASES EMPLOYING USER PROFILES

FIELD OF THE INVENTION

The present invention relates to computer software programs and more particularly to a computer software search program to search distributed text databases.

BACKGROUND OF THE INVENTION

At the present time there is a need for a more accurate computer software search program to search distributed text databases in response to a user's query and to respond by retrieving the documents, or sections of documents, most pertinent to the query. A database is a body of information made up of records. A user of the Internet and World Wide Web (WWW) may be interested in obtaining documents relating to a relatively narrow field, for example, the present physical location of guitars that had been owned by Bob Dylan, or documents describing cures for microscopic colitis.

Despite the fact that enormous popularity and sophisticated technology turned the Internet into not only the major source of information, but also media for a wide range of day-to-day activities, WWW, and other distributed sets of databases, still remains not a too friendly place for a typical Internet user. This is due partly to overwhelming amounts of information accessible through the Internet and partly to the fact that intrinsic "natural laws" of the cyber World significantly differ from those with which Internet users gained familiarity in the real World.

Effective information acquisition has two crucial aspects: retrieval and presentation. A successful retrieval should utilize all available sources of information and select those which are the most suitable to the type of information required or the most appropriate to the query that initiated the process. On the other hand, the presentation should reorganize the acquired information by eliminating the irrelevant or technically inaccessible information and by sorting, ordering and grouping the relevant information in a manner that enables the real World user to take decisions and to react efficiently.

The success of both of these aspects depends critically on the ability to understand the needs and intentions behind the process of information acquisition, as well as on the ability to evaluate the acquired information. The existing instruments for information acquisition from the Internet (search engines, portals, etc.) have failed to develop any of these abilities and depend heavily on the experience and skillfulness of an Internet user.

Using the presently available search engines, such as LYCOS™, EXCITE™, INFO SEEK™, WEB CRAWLER™, ALTA VISTA™, NORTHERN LIGHT™, YAHOO™, HOT BOT™, or a meta-search engine such as META CRAWLER™, DOGPILE™, INFERENCE FIND™, MAMMA™ and SAVVY SEARCH™, it often is difficult, time-consuming and frustrating for the user to obtain the exact information regarding what the user enters as an enquiry to the search engine. It is not uncommon for the user to be told, by the search engine, that an enquiry resulted in over 20,000 documents or that there are no documents—when in fact there are many. An important function is the "ranking" of the documents found in a search, with generally the 10 highest ranking documents being presented first, followed by the next 10, etc., etc. The user's enquiry, sometimes called "search strategy statement", generally uses specific terms, i.e., keywords.

That process, however, often gives inaccurate results in that it misses relevant documents, provides irrelevant documents, and often provides too many documents. Consequently, there is an urgent need for a kind of "virtual representative" of a real World user in the cyber World that is able to accurately acquire information on behalf of the user.

Such a virtual representative can serve as a personal assistant—born and bred in the cyber World. This assistant can independently perform numerous activities on behalf of a real World user and not only relieve him or her from the Web routine, but also increase significantly the productivity of his or her activities using sets of distributed databases, such as the WWW.

SUMMARY OF THE INVENTION

The present invention provides a robot (independently operating agent that combines machine understanding and automation of routines). The robot is capable of (1) collecting information from a variety of Web, or other distributed data based sources in parallel; (2) semantically analyzing the retrieved information in order to evaluate its suitability to user's intentions and expectations; (3) reorganizing the retrieved information in a useful manner; and (4) extracting information concerning an Internet user in order to formulate his, or her, foci of interest. This robot operates "on top" of various Web based and other sources of information and instruments for information acquisition and does not require any particular database of its own or any reprocessing of the Web content.

The robot is activated by an explicit user's action (e.g. posting a query), or automatically when searching for Web content that match foci of interest of a user. In both cases the robot can collect information either from a set of information sources predefined by the user (e.g., a particular Web site, search engines supplying a particular type of content, such as news or press releases etc.), or by automatically selecting the most appropriate sources of information. This activity of the robot is terminated either by an explicit action on behalf of a user, or when exhausting all the relevant sources, or when a satisfying amount of relevant information has been retrieved.

The retrieved information is semantically analyzed. The obsolete or inaccessible information is completely ignored. From each retrieved document the semantic core information is extracted in order to create its "shorthand" signature. These signatures are compared in order to detect the semantic common denominators and to group the retrieved documents by common topics. The resulting subgroups are sorted, by their relevancy to the initial query, and ranked by their suitability to the user's foci of interest. If necessary, the documents are further grouped by the domains in their Uniform Resource Identifiers (URI). Accordingly, the results are not presented in their raw form (like in regular search engines), but rather as topics extracted from retrieved documents which are sorted "on-the-fly" by their semantic relevancy to the query and ranked by their suitability to the user's interests.

The robot can learn about user's interests in a variety of ways. It can extract the most dominant topics from any textual information electronically supplied by the user (such as the so-called "bookmarks" or "favorites" from a Web browser or any other set of documents that are representative of his or her interests). In addition, the robot follows user's reactions to supplied information: selected topics, preferred information sources, typical domains, preferred type of documents etc. The collected information is incorporated into the user's foci of interest in order to keep them updated. They are further enhanced with the information from frequently repeated queries. The user is also allowed to manually modify and enrich his or her foci of interest. The robot is equipped with a mechanism simulating natural amnesia which disregards and eventually removes obsolete constituents.

If the robot is based on a Web server, rather than on the client computer, the robot can operate independently and without any direct supervision on behalf of a user. A user can be informed when the required information is available and he or she can access the information next time when the user comes on line (connects to the server).

BRIEF DESCRIPTION OF THE DRAWINGS

In the drawings, the FIGS. 1–4 are computer block flow diagrams.

DETAILED DESCRIPTION

Figure 1:
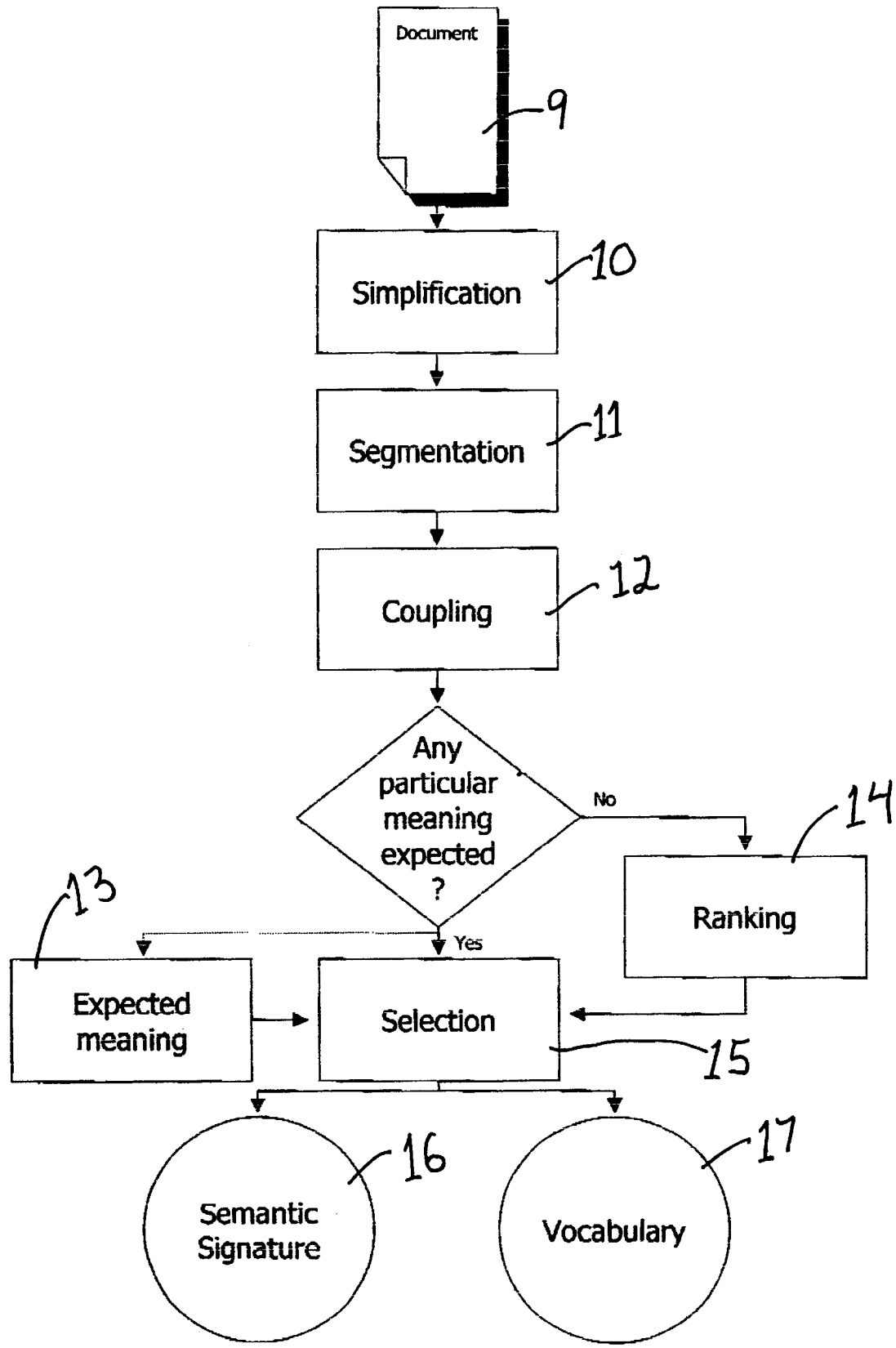
FIG. 1 shows extraction of core semantic information from a document.

Analysis of Documents that are Representative of User's Interests

The user is enabled to submit any document that he or she considers to be representative of his or her interests. These documents are typically saved in a Web browser as Uniform Resource Identifiers called "bookmarks" or "favorites". However, the documents need to be supplied in some recognizable format (e.g. HTML, plain ASCII etc.)

Such a document is processed in the following manner:
1. The text of the document is simplified by:
    1. Removing syncategoremic expressions (also called "stop-words") such as articles ("the", "a", "an"), prepositions (e.g., "in", "at", "among" etc.), conjunctions (e.g., "and", "but", "yet" etc.) and interjections (e.g. "wow", "no", "oh" etc.). This set of exclusions is further extended to adverbs recognizable by the suffix—"ly" and to every type of pronoun.
    2. Removing morphological inflections for the Saxon genitive (e.g., "John's" is transformed into "John") and plural forms (e.g., "chairs" is transformed into "chair"). However, the Saxon genitive and plural forms are preserved if they grant some specific meaning that differs from the meaning that the same word carries in its basic form (e.g. "McDonald's" as opposed to "McDonald" or "arms" as opposed to "arm").
2. The document is divided into segments delimited by one of the following characters:
    full stop (".")
    question mark ("?")
    exclamation mark ("!")
    colon (":")
    semicolon (";")
    comma (",")
    linefeed/carriage return ("¶")
    square brackets ("[", "]")
    braces (" ", " ")
3. All the words within each segment are coupled in order to create a set of pairs. In practice, the coupling is performed in the following manner: each word is coupled with every other word from a segment given that they are λ or less words apart or formally:

$$1 < l_{(w_0, w_n)} \leq \lambda$$

where $w_0$ and $w_n$ stand for coupled words and l is the distance between them counted as the number of categoremic words that separate them in a segment of text created as described above. For all practical purposes, l is usually set to 3. The resulting pair of words is referred to as a "connection".

For example, a segment is "John is trying to find a guitar." The pairs of words (the connections) with X set at 3, would be "John-trying", "John-find", "trying-find", "trying-guitar" and "find-guitar"
4. For each connection, as well as for each word, an incremental counter is maintained. These counters count the frequencies of occurrence of each single word and each connection in the document. For example, the word "guitar" may appear 12 times in a document and the pair (connection) "find-guitar" may appear 2 times.
5. An abstraction containing core semantic information and called a "signature" is extracted from the document in the following way:
    1. All the connections are sorted descending:
        1. by the frequency of occurrence of the connection, then
        2. by the frequency of occurrence of the more frequent word in the connection, then
        3. by the frequency of occurrence of the less frequent word in the connection, then
        4. by whether connection appears in the document's title and then
        5. randomly.
    2. A subset of top n% of connections is selected. For all practical purposes n is calibrated in the way that this subset usually does not exceed top 10 connections.

Consequently, a signature d of document Δ can be defined as:

$$d = \{\{w_0, w_n\} \mid (1 < l_{\Delta(w_0, w_n)} \leq \lambda) \wedge (i_{\Delta(w_0, w_n)} \geq v)\}$$

where the sorting rank $i\Delta_{w0}$ of a word $w_0$ exceeds some predefined constant V. The signatures of all submitted documents form a set called user's "vocabulary":

$$V = \{d\}$$

6. All the words contained in the signature are presented to the user as being the user's focus of interest. The user can manually modify the signature in any desirable way. If approved, this signature, which is the user's focus of interest, will serve as a fixed query for future automatic retrieval of matching information.
7. When approved, the foci of interest are further processed.
    1. All the words from a focus of interest are combined in order to create the top level connections:

$$T_F = \{\{f_0, f_n\}\}$$

2. A focus of interest is further enriched by creating its extension from the user's vocabulary:

$$E_F = \{\{f, w\} \mid (f \in F) \wedge (\{f, w\} \in V)\}$$

Initiation of Information Acquisition

Information acquisition is initiated as follows:

1. automatically by utilizing fixed queries that were pre-defined as user's foci of interest ("implicit query"),
2. by an explicit action on behalf of the user ("explicit query"):
   1. the user may formulate a query, as he or she would in a regular search engine,
   2. the user may also point to a document containing textual information (or to any particular part of such a document, e.g., a paragraph).

If the information acquisition is initiated by pointing to a document Δ, a signature d is extracted from the document, as described above. If the user pointed to a particular part of the document, only this part is treated as Δ. The query is formulated from the signature by enumerating all words contained in it.

Each query is submitted to a variety of search engines, directories and other specialized information sources. The submission enforces the Boolean relationship of conjunction by preceding each word from the query with the sign "+" and by grouping the words from the query by double quotation marks.

Implicit and explicit queries can also be limited to a particular domain as it occurs in Uniform Resource Identifiers. In this case, the query is not submitted to any of the information sources mentioned above, but all the documents belonging to this particular domain are retrieved instead.

Semantic Analysis of Retrieved Documents

All the retrieved documents are processed, in order to extract the relevant semantic information, as follows:

1. The text of the document is simplified by removing syncategoremic expressions and morphological inflections, as described above.
2. The document is divided into segments, as described above.
3. The words within a segment are coupled in connections, as described above.
4. A subset of connections, containing at least one of the words from the query, is extracted from the document. This subset is also referred to as a "signature".

If these documents were retrieved by an implicit query, this information is utilized for ranking the relevance of retrieved documents to the user's foci of interest, as described below. If the information retrieval was initiated by an explicit query, this information is utilized to extract various subgroups of semantically related documents. For this purpose the query that initiated the retrieval can be defined as set Q that contains all the query words q.

$$Q=\{q\}$$

Consequently, signature $d_Q$ of a document Δ can be defined as:

$$d_Q = \{\{q, w\} \mid (q \in Q) \wedge (w \in \Delta) \wedge (1 < l_{\Delta(\phi,w)} \leq \lambda)\}$$

Accordingly, a semantic group $S_Q$ of a query can be defined as:

$$S_Q = \{\{q, w\} \mid (q \in Q) \wedge (w \in W \neq 0) \wedge (1 < l_{(q,w)} \leq \lambda)\}$$

where W stands for any non-empty set of words w recognizable in a particular language (e.g. English language).

Since there may be signatures that do not contain connections that satisfy the condition, $1 \leq l_{(q,w)} \leq \lambda$, a domain $D_Q$ of the semantic map $S_q$ must be defined:

$$D_Q = \{d_Q \mid d_Q \subseteq S_Q\}$$

The domain $D_Q$ can be referred to as the subgroup of semantically related documents, while the semantic map can be referred to as their common topic. It is worth noticing that this definition implies that the semantic map of the query Q may contain several well distinguished subsets. The subset can be valid in the domain $D_Q^{(1)}$, another subset $S_Q^{(2)}$ can be valid in the domain $D_Q^{(2)}$, etc. However, the domains $D_Q^{(1)}$, etc. may or may not overlap.

In practice this may be due to the lexical ambiguity of qϵQ leading to well distinguished subsets within a semantic map that are organized around its various meanings. However, this may also be due to the inconsistence of the verbal expression, leading to a large number of subsets that are not more than verbal variations of the same expression. In the latter case, not all of the subsets would really answer typical expectations from a common topic.

Accordingly, methodology must be formulated that can establish priorities among various subsets within semantic maps. These priorities should minimize the accidental diversity of verbal expressions by depicting the most common topics and at the same time guarantee that the real semantic ambiguities will ultimately lead to separate, well distinguished subsets. The following are the principles for this methodology:

1. Connections contained in larger number of various documents are less likely to be a result of verbal variations of the same expression than are connections that occur in less documents (particularly if they occur in a single document).
2. Connections that occur in the title of a document are less likely to be a result of verbal variations of the same expression than are connections that occur in the body of the document, where frequent repetitions require rephrasing.
3. Connections that occur more frequently, in general, are less likely to be a result of verbal variations of the same expression than are connections that occur seldomly. In addition, particular attention must be paid to the choice of q in Q={q}. These must be obviously categoremic words in order to avoid creation of topics containing merely syncategoremic words.

Subsequently, the methodology is implemented in the following procedural steps:

1. The signature of all documents in the set are compared in order to establish priorities among the connections from them. All the connections are sorted in the following descending order:
   1. by the number of documents in which they occur, then
   2. by the number of words from the query contained in the connection, then
   3. by the number of titles in which they occur, then
   4. by the total frequency of occurrence (collectively in all documents)

2. The topmost available connection is extracted as the initial connection.
3. The initial connection is compared to all the others and the connections containing one of the words from the initial connections are extracted. This subset of connections is referred to as a "topic". All the documents having at least one of the connections included in the topic, form a subset of documents sub-grouped by this topic.
4. The topmost available connection that belongs to this subset of documents is extracted as the new initial connection.
5. This new initial connection is compared to all the others and the connections containing one of the words from it are extracted. This new subset of connections is referred to as a "sub-topic". All the documents in which occurs at least one of the connections included in the sub-topic, form a subset of documents sub-grouped by this sub-topic.
6. Steps #4 and 5 are repeated as long as there are available connections that belong to the subset of documents created in step #3.
7. The entire process is repeated from step #2 as long as there are available connections.
8. All the topics are compared in order to detect and unify topics that contain identical words, although they have been created from differing connections (e.g. a topic created by the connections "ab" and "bc" contains identical words—i.e., "a", "b" and "c"—as does another topic created by the connections "ac" and "bc").

Presentation of Retrieved Documents

If the retrieval was initiated by an implicit query, the relevance of the retrieved documents, to the user's foci of interest, is estimated in the following manner:
1. All the topics containing at least one query word (not counting syncategoremic words) are presented. If more than one document is sub-grouped by any of the sub-topics contained in a presented topic, this sub-topic is presented as an independent topic.
2. Two counters—primary and secondary—are maintained for each retrieved document:
   1. For every connection contained in the top level connections that is detected in the document the primary counter is incremented one point.
   2. For every connection contained in the extension that is detected in the document the secondary counter is incremented 1 point, on the condition that the respective top level connection was detected in the same document.
3. Documents are sorted in descending order, first by the primary counter, then by the secondary counter, and then randomly.
4. The documents are presented to the user only if the primary counter is higher than 0. The counters are normalized to their highest possible score for the particular focus of interest, the normalized scores are weighted appropriately and presented as the percentage of document's relevance to user's interests.
5. The documents are presented to the user either by the type (e.g. article, product description, front page of a portal, a message posted in a user group etc.) or as top 10 recommendations that combine documents of various types.

If the retrieval was initiated by an explicit query, the resulting topics are presented in the following manner:
1. All the topics containing at least one query word (not counting syncategoremic words) are always presented, except when the query contains two words (not counting syncategoremic words). In the latter case, all the subtopics of the topic containing both query words are presented, as well as the topics containing at least one of the query words.
2. All the presented topics are sorted in descending order by the number of query words contained in the topic.
3. Topics with a single underlying documents in their respective subsets are grouped in a common topic referred to as a "general". Consequently, only topics and subtopics with two or more underlying documents in their respective subsets can be presented as separate topics.
4. The documents sub-grouped by topics are ranked by their relevance to the user's foci of interest, as described above, with the difference that the ranking is performed by the highest scoring focus of interest.
5. The topics containing documents that scored on relevance to user's interests are marked in order to indicate that they contain documents of a particular relevance to the user.

Termination of Information Acquisition

If the information acquisition was initiated automatically by an implicit query, the acquisition is terminated either (i) when all the predefined information sources are completely exhausted, or (ii) by action on behalf of the user. If the information acquisition was initiated by an explicit query, the information acquisition is terminated if there are N or more topics presented (not counting the "general" topic), or if there are M or more documents sub-grouped by any particular topic other than the "general". However, all the retrieved documents already contained in the computer's memory buffer will be processed, even after termination of the acquisition.

Monitoring User's Activities

A user's reactions to the presented information are systematically monitored. Whenever a user selects a retrieved document, or topic, by which retrieved documents are sub-grouped, the following information is collected:
1. the particular focus of interest that initiated the retrieval of the document (in the case that the information acquisition was initiated by an implicit query) or the topic by which the document was sub-grouped in the particular subset of documents (in the case that the information acquisition was initiated by an explicit query),
2. the information source (e.g. search engine, portal etc.) that retrieved this particular document,
3. the domain of the document, from its Uniform Resource Identifier,
4. type of information contained in the document (e.g., article, product description, front page of a portal, a message posted in a user group etc.)

This information is utilized in the following manner:
1. The information on a particular focus of interest ensures that this focus of interest will not be erased from the memory by a mechanism that simulates natural amnesia, as described below. The information on a selected topic contributes to the process of extracting relevant information from frequent queries, as described below.

2. For each information source a counter is maintained. This counter holds the rate of success of this particular source, counted as the number of times that the information from this source was selected by the user. A separate counter is maintained for the information acquisition initiated by an implicit query and for the information acquisition initiated by an explicit query. The counters decide which information source is preferred when a particular type of information acquisition is initiated.

3. For each domain a counter is maintained. This counter keeps count of how many times a particular domain was visited by the user. When the frequency of visits exceeds some predefined constant, the user is prompted with the suggestion to utilize this domain for domain-restricted information acquisition, as described above.

4. For each document type a counter is maintained. This counter accounts for the document types which are preferred by a particular user. This document type counter indicates which document type is preferred, and is used for selecting the list of top 10 recommendations.

Extracting Information from Frequent Queries

When a user selects a topic, by which the retrieved documents are sub-grouped, this information is processed in the following manner:

1. The topic is simplified by removing morphological inflections, as described above (the syncategoremic expressions do not need to be removed, since a topic by definition does not contain any).

2. All the words within the topic are coupled in order to create connections, as described above. The connections are added to the user's vocabulary.

3. For each connection a counter is maintained that counts the frequency of occurrence of a particular connection in topics selected by the user. When this frequency exceeds some predefined constant, the connection is treated as a focus of interest and the user is prompted for approval. The user can manually modify it in any way the user desires. If approved, this focus of interest will serve as a fixed query for future automatic retrieval of matching information.

4. When the approved focus of interest is further processed in order to create the top level connections $T_F$ and the extension $E_F$ as described above.

Simulating Natural Amnesia

In order to keep the foci of interest updated, the following mechanism, which simulates natural amnesia, is introduced:

1. The date is recorded when a particular focus of interest is approved by a user.

2. This date is updated every time the user decides to open a document that was retrieved by this particular focus of interest as described below:
   All the foci of interest are monitored daily. If the difference in dates from the date of the last update exceeds, for a particular focus of interest, a predefined constant, the following steps are taken:
   a. It is assumed that there is a problem with this particular focus of interest (e.g., a spelling mistake) and the user is prompted to inspect its correctness (alternative spellings or alternative words from the user's vocabulary may be suggested).
   b. If no correcting modifications were committed, the user is prompted with the suggestion to remove it from the list of foci of interest.

The invention is explained, in part, by reference to the drawings.

FIG. 1 shows extraction of core semantic information ("semantic signature") from a document. The steps are as follows:

Step 1: A document 9 is simplified 10 by removing all syncategoremic expressions and removing certain morphological inflexions.

Step 2: The document is segmented 11 by certain interpunctional signs (such as period, colon, semi-colon, etc.).

Step 3: Words within a segment are coupled 12 into adjacent pairs called "connections". Connections store the semantic information by preserving the original context.

Step 4: Depending on whether the document was retrieved by an explicit query or not, a selection of the most representative connections is extracted from the documents. If the document was retrieved by an explicit query, the query is treated as the expected meaning of the document 13. Consequently, the only connections containing at least one word from the query are selected. Otherwise, all the connections are ranked 14 by their frequency of occurrence and by the frequency of occurrence of the words they contain. The connections whose rank exceeds some predefined constant are selected 15.

Step 5: The selected connections are considered to be the document's "semantic signature" 16. If the document was supplied by a user as a document representative of his or her interests, the selected connections are also recorded in a database containing the vocabulary 17 that is characteristic of that particular user.

Figure 2:
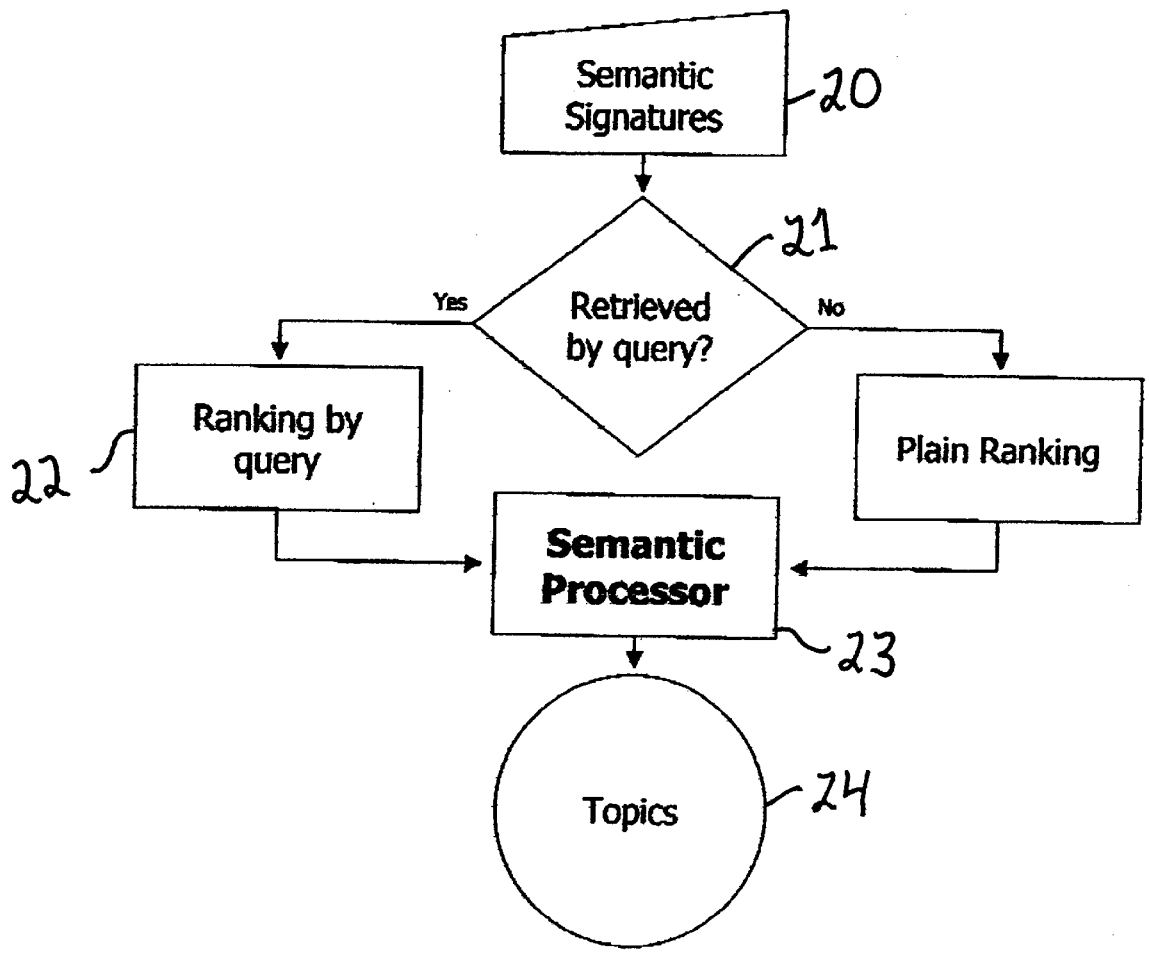
FIG. 2 shows semantic mapping.

FIG. 2 shows semantic mapping. The steps are as follows:

Step 1: Semantic signatures 20 from a particular set of documents (e.g., all the documents retrieved by an explicit query or all the documents supplied by a user as representative of his or her interests) are combined together. Depending on whether the document was retrieved by an explicit query 21, these connections are ranked 22 by their adequacy to the query. They are also ranked by the number of documents in which they occur and by their frequency of occurrence in various documents.

Step 2: Starting with the higher ranking connections, all the connections are organized into semantic maps. These semantic maps reconstruct the original contexts by chaining connections with overlapping words, on the condition that they occur in identical documents. This recursive grouping and sub-grouping is performed by the "Semantic processor" 23.

Step 3: The resulting semantic maps are related to as "Topics" 24 which are utilized for grouping of the underlying documents into sets with a common semantic denominator.

Figure 3:
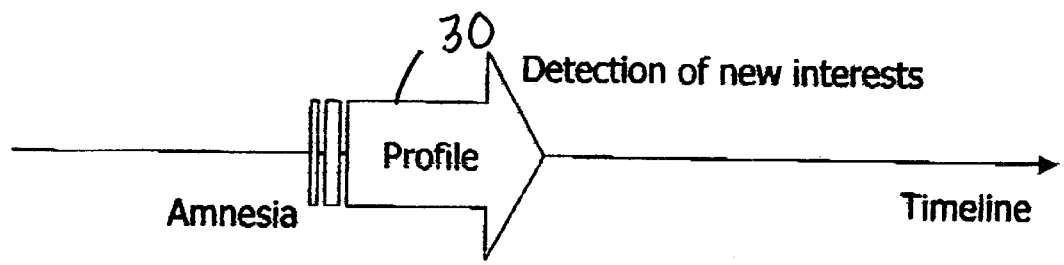
FIG. 3 shows dynamic upgrade of a personal profile.

FIG. 3 shows dynamic upgrade of a personal profile. A user's profile 30 containing his or her foci of interests is dynamically updated by adding new foci developed in the course of time, as well as removing the foci that become obsolete. Such a profile is like a window into a user's interests which moves on the timeline as there occur shifts in his or her interests.

Figure 4:
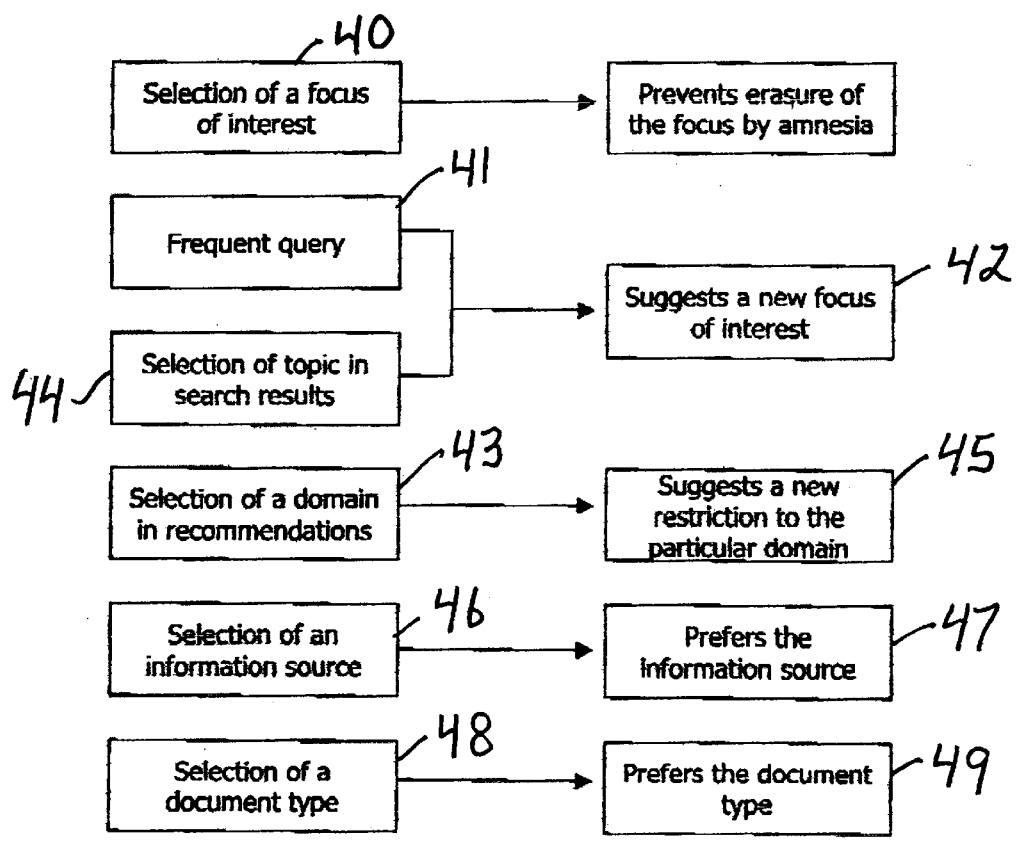
FIG. 4 shows sources of influence on dynamic profile upgrade.

FIG. 4 shows sources of influence on dynamic profile upgrade and their respective influence.

1. Every time a user selects a document 40 retrieved by a focus of his or her interest, this particular focus is imprinted in the memory. Foci that retrieve documents, which do not generate user's selection are, on the other hand, gradually erased from the memory.
2. Frequent queries 41 and frequent selections of a topic 44 in search results lead to the suggestion of the connections contained in the query or in the topic as a possible new focus of interest 42.
3. Every query can be restricted to a particular domain 43 as it appears in Uniform Resource Identifiers. A frequent selection of documents with a particular domain (in their URI) leads to the suggestion of this particular domain 45 as the restriction for the future retrieval. If accepted, only the updates and recent modifications of content located in this domain will be reported to the user.
4. Frequent selection of the documents retrieved by a particular search engine or retrieved from a particular content supplier leads to the preference of this particular source of information for the future retrievals 46. Accordingly, these sources will be accessed first during the retrieval 47.
5. Frequent selection of a particular document type 48 (text, graphics, sound, etc.) leads to the preference of this document type 49 for future retrievals. Accordingly, more documents of this particular type will be included within the top 10 recommendations than would normally occur.

What is claimed is:

1. A method for locating documents stored within a plurality of distributed databases, the method comprising the steps of:

generating a user profile including a user focus of interest;

retrieving, in real-time, selected documents from the plurality of distributed databases by utilizing one of an automated query based on the user focus of interest, a user-formulated query, and a query formulated based on a user-specified reference;

extracting semantic information from the retrieved document;

sorting the semantic information to generate a list;

presenting the sorted list of semantic information to the user; and terminating the retrieval of the documents when one of the query of the plurality of distributed databases is exhausted, an amount of the presented semantic information exceeds a user-specified maximum amount, and a termination condition predefined by the user is satisfied.

2. The method according to claim 1, wherein the generating step includes the following substeps:

monitoring a selection of documents by the user; and semantically analyzing one of a textual content supplied by the user, a content of a saved Uniform Resource Identifier in a user's browser, a content of a Uniform Resource Identifier supplied by the user, a text document in a recognized digital format, and a text document formulated in a natural language, by:

removing at least one syncategoremic expression therefrom, removing at least one morphological inflection therefrom, segmenting each of the selected documents into a plurality of segments, wherein each segment includes a set of data delineated by a punctuation character, segmenting each of the plurality of segments into a plurality of words, coupling each word of a first segment to each of a plurality of proximate words separated therefrom by no more than a predetermined number of words to generate a plurality of word pair couples, maintaining an incremental counter for each word and each word couple from the selected documents, sorting the word couples in descending order from a top to a bottom as a function of sorting criteria, wherein the sorting criteria include the following in the following order:

a frequency of occurrence of the word couple, a frequency of occurrence of the most frequent word in the word couple, a frequency of occurrence of the least frequent word in the word couple, an appearance of the word couple in a title of the document, and random selection of word couples, selecting a predefined subset from an initial portion of the sorted word couples, updating the user focus of interest, and manually modifying the selected subset of the sorted word couples.

3. The method according to claim 2, wherein the updating step includes the following substeps:

monitoring a record of dates on which the user accesses each of the selected documents for a first focus of interest, comparing a most recent date with a current date, and prompting the user to inspect and remove the first focus of interest if a difference between the most recent date and the current date exceeds a predefined constant.

4. The method according to claim 1, wherein the extracting step includes the following substeps:

removing at least one syncategoremic expression from a document selected by the user, removing at least one morphological inflection from the selected document, dividing the selected document into a plurality of segments, wherein each segment comprises a set of data delineated by a punctuation character, dividing each of the plurality of segments into a plurality of words, coupling each word of a first segment to each of a plurality of proximate words separated therefrom by no more than a predetermined number of words to generate a plurality of word pair couples, selecting a predetermined number of the subsets of word couples for use in representing the selected document, wherein the predetermined number of subsets are selected from the top of the sort, and determining the relevance of each of the subsets to one of the query based on the user focus of interest, the user-formulated query, and the query formulated from a user-specified reference.

5. The method according to claim 4, wherein the determining step includes the following substeps:

sorting the plurality of subsets in descending order as a function of:
- a number of documents in which the word couples of the subset occur,
- a number of document titles in which the word couples of the subset occurs, and
- a total frequency of occurrence of the words of each of the word couples of the subset collectively in all documents, extracting the topmost available subset from the sorted subsets;

comparing the topmost available subset to the rest of the subsets; and extracting from the plurality of subsets each subset containing at least one word of the topmost available subset.

6. The method according to claim 1, wherein the presenting step includes the following substeps:
- maintaining a counter for each word couple contained in the initial portion of the sorted subsets detected in each of the searched documents, and
- presenting to the user each document for which the word couple counter is at least a predetermined number.

7. A method for monitoring a user's activities to aid in a search for documents from a plurality of distributed databases, the method comprising the steps of:
- generating a user profile including a user focus of interest;
- recording a content of a user query;
- recording a particular database from which a document was retrieved based on the user query;
- recording a domain of the document from a corresponding Uniform Resource Identifier; and
- recording a type of information contained in the retrieved document.

8. The method according to claim 7, wherein the generating step includes the following substeps:
- removing morphological inflections from the topic of interest;
- coupling words within the topic of interest to create word couples;
- adding the word couples to a user vocabulary;
- maintaining a counter of an occurrence frequency of each of the word couples; and
- prompting the user to approve a first one of the word couples as a focus of interest when a frequency of occurrence of the first word couples exceeds a predetermined constant.

9. The method according to claim 8, further comprising the steps of:
- comparing the recorded information to the user focus of interest;
- recording dates on which the user focus of interest is accessed;
- comparing a most recent date on which the user focus of interest was accessed with a current date; and
- prompting the user to inspect and remove the focus of interest if a difference between the most recent date and the current date exceeds a predefined constant.

10. The method according to claim 8, further comprising the steps of:
- maintaining a counter for each database from which a document is retrieved;
- sorting the databases in descending order of frequency to generate a list; and
- adding the list to the user profile, the list being indicative of user's preference of the database.

11. The method according to claim 8, further comprising the steps of:
- maintaining a counter for each user visit to a domain of a retrieved document; and
- specifying the domain as a domain-restricted information acquisition when the frequency of visits to the domain exceeds a predefined value.

12. The method according to claim 8, further comprising the step of maintaining a counter for each of a plurality of types of information contained in retrieved documents, wherein the counter indicates the preferred type of information.

13. An independently operating computer system for finding documents from a plurality of distributed databases comprising:
- a memory arrangement;
- a communication arrangement; and
- a processor generating a user profile including a user focus of interest to be stored in the memory arrangement, the processor retrieving, in real-time, documents, using the communication arrangement, from the plurality of distributed databases by utilizing one of:
  (i) an automated query based on the user focus of interest,
  (ii) a user-formulated query, and
  (iii) a query formulated from a user-specified reference, wherein the processor extracts semantic information from each retrieved document and sorts the semantic information to generate a list which is stored in the memory arrangement, the processor presenting the sorted list of semantic information to the user, the processor terminating the retrieval of the documents when one of the query of the plurality of distributed databases is exhausted, the amount of the semantic information presented exceeds a user-specified maximum amount, and a predefined termination condition is satisfied, the processor monitoring the user's activities to update the user profile.

14. A method for aiding a user in finding documents within a plurality of distributed databases, the method comprising the steps of:
- generating a user profile including a user focus of interest;
- retrieving, in real-time, documents from the plurality of distributed databases by utilizing one of:
  (i) an automated query based on the user focus of interest,
  (ii) a user-formulated query, and
  (iii) a query formulated from a user-specified reference;
- extracting semantic information from the retrieved documents;
- sorting the semantic information to generate a list;
- presenting the sorted list of semantic information to the user; and
- terminating the retrieval of documents when one of the query of the plurality of distributed databases is exhausted, the amount of the semantic information presented exceeds a user-specified maximum amount, and a predefined termination condition is satisfied;
- monitoring the user's activities including the steps of:
  - recording a content of one of an automated query based on the user focus of interest, a user-formulated query, and a query formulated from a user-specified reference;

recording databases from which documents are retrieved by the user;

recording a domain of retrieved documents from corresponding Uniform Resource Identifiers; and recording a type of information contained in each of the retrieved documents.

* * * * *